US010659303B2

(12) United States Patent
Tabak et al.

(10) Patent No.: US 10,659,303 B2
(45) Date of Patent: May 19, 2020

(54) EXTERNAL DATA COLLECTION FOR REST API BASED PERFORMANCE ANALYTICS

(71) Applicant: ServiceNow, Inc., Santa Clara, CA (US)

(72) Inventors: Aida Rikovic Tabak, Amsterdam (NL); Ciprian Mocanu, Amsterdam (NL); Andrei Gabur, Almere (NL); Adrianus Augustinus Mathijssen, Drontent (NL); Georgi Ivanov, Amstelveen (NL)

(73) Assignee: ServiceNow, Inc., Santa Clara, CA (US)

( * ) Notice: Subject to any disclaimer, the term of this patent is extended or adjusted under 35 U.S.C. 154(b) by 216 days.

(21) Appl. No.: 15/787,409

(22) Filed: Oct. 18, 2017

(65) Prior Publication Data

US 2019/0102440 A1    Apr. 4, 2019

Related U.S. Application Data

(60) Provisional application No. 62/568,087, filed on Oct. 4, 2017.

(51) Int. Cl.
*G06F 9/54* (2006.01)
*G06F 16/2457* (2019.01)
(Continued)

(52) U.S. Cl.
CPC ........ *H04L 41/0859* (2013.01); *G06F 3/0481* (2013.01); *G06F 3/0482* (2013.01); *G06F 3/0486* (2013.01); *G06F 3/04847* (2013.01); *G06F 9/451* (2018.02); *G06F 9/461* (2013.01); *G06F 9/4881* (2013.01); *G06F 9/5038* (2013.01); *G06F 9/547* (2013.01); *G06F 11/14* (2013.01); *G06F 11/3006* (2013.01); *G06F 11/3452* (2013.01); *G06F 16/248* (2019.01);
(Continued)

(58) Field of Classification Search
USPC ........................................................ 707/723
See application file for complete search history.

(56) References Cited

U.S. PATENT DOCUMENTS 6,970,865 B1 * 11/2005 Plasek ................. G06F 16/2246
7,158,969 B2 *  1/2007 Dettinger ............ G06F 16/2452
(Continued)

*Primary Examiner* — Kim T Nguyen
(74) *Attorney, Agent, or Firm* — Fletcher Yoder PC

(57) ABSTRACT

A hosted client instance includes a performance analytics module to present an internal key performance indicator and an external key performance indicator on a performance analytics dashboard. A query is executed to a connection to an external data source over a network to obtain a result set of data associated with the external key performance indicator. REST APIs associated with the performance analytics module are executed to: store the result set of data in a performance analytics storage device on the hosted client instance, the performance analytics storage device storing both the data associated with external and internal key performance indicators; and render, via a UI rendering engine of the performance analytics module, one or more widgets on the performance analytics dashboard. The REST APIs interact with the data associated with the internal and external indicators in the storage device to render the one or more widgets.

20 Claims, 7 Drawing Sheets

(51) Int. Cl.

| | | |
|---|---|---|
| H04L 12/24 | (2006.01) | |
| G06F 9/50 | (2006.01) | |
| G06F 9/48 | (2006.01) | |
| G06F 9/46 | (2006.01) | |
| H04L 29/08 | (2006.01) | |
| H04L 29/06 | (2006.01) | |
| G06F 11/14 | (2006.01) | |
| G06F 40/18 | (2020.01) | |
| G06F 40/186 | (2020.01) | |
| G06F 16/951 | (2019.01) | |
| G06F 9/451 | (2018.01) | |
| G06F 16/27 | (2019.01) | |
| G06F 16/242 | (2019.01) | |
| G06F 16/248 | (2019.01) | |
| G06F 11/30 | (2006.01) | |
| G06F 11/34 | (2006.01) | |
| G06F 3/0486 | (2013.01) | |
| G06Q 10/06 | (2012.01) | |
| G06Q 30/06 | (2012.01) | |
| H04L 12/26 | (2006.01) | |
| G06F 3/0484 | (2013.01) | |
| G06Q 30/00 | (2012.01) | |
| G06Q 50/18 | (2012.01) | |
| G06F 16/904 | (2019.01) | |
| G06F 3/0482 | (2013.01) | |
| G06Q 40/00 | (2012.01) | |
| G06F 16/30 | (2019.01) | |
| G06F 3/0481 | (2013.01) | |
| G06F 9/445 | (2018.01) | |
| G06F 21/53 | (2013.01) | |
| G06F 21/57 | (2013.01) | |

(52) U.S. Cl.
CPC .... *G06F 16/2423* (2019.01); *G06F 16/24578* (2019.01); *G06F 16/27* (2019.01); *G06F 16/30* (2019.01); *G06F 16/904* (2019.01); *G06F 16/951* (2019.01); *G06F 40/18* (2020.01); *G06F 40/186* (2020.01); *G06Q 10/067* (2013.01); *G06Q 10/0635* (2013.01); *G06Q 10/06314* (2013.01); *G06Q 10/06315* (2013.01); *G06Q 10/06393* (2013.01); *G06Q 30/018* (2013.01); *G06Q 30/0603* (2013.01); *G06Q 30/0635* (2013.01); *G06Q 30/0641* (2013.01); *G06Q 40/12* (2013.12); *G06Q 50/184* (2013.01); *H04L 41/0803* (2013.01); *H04L 41/0843* (2013.01); *H04L 41/0893* (2013.01); *H04L 41/12* (2013.01); *H04L 41/22* (2013.01); *H04L 43/045* (2013.01); *H04L 43/08* (2013.01); *H04L 43/50* (2013.01); *H04L 63/10* (2013.01); *H04L 63/1433* (2013.01); *H04L 63/20* (2013.01); *H04L 67/26* (2013.01); *H04L 67/32* (2013.01); *G06F 3/0484* (2013.01); *G06F 9/44505* (2013.01); *G06F 21/53* (2013.01); *G06F 21/577* (2013.01); *H04L 41/0879* (2013.01); *H04L 67/12* (2013.01); *H04L 67/34* (2013.01)

(56) References Cited

U.S. PATENT DOCUMENTS

| | | | |
|---|---|---|---|
| 8,595,186 B1 | 11/2013 | Mandyam et al. | |
| 8,600,982 B2* | 12/2013 | Bartomeli | G06F 16/93 |
| | | | 707/723 |
| 8,782,069 B2* | 7/2014 | Jockish | G06F 16/334 |
| | | | 707/759 |
| 8,838,748 B2* | 9/2014 | Nair | G06F 8/38 |
| | | | 709/203 |
| 8,977,600 B2* | 3/2015 | Crupi | G06F 16/24568 |
| | | | 707/688 |
| 9,319,283 B2* | 4/2016 | Ponnavaikko | H04L 41/5083 |
| 2017/0085447 A1 | 3/2017 | Chen et al. | |

* cited by examiner

EXTERNAL DATA COLLECTION FOR REST API BASED PERFORMANCE ANALYTICS

CROSS REFERENCE TO RELATED APPLICATIONS

This application claims priority to U.S. Provisional Application No. 62/568,087 filed Oct. 4, 2017, entitled "Platform Computing Environment and Functionality Thereof," by Purushottom Amradkar, et al. for all purposes, the contents of which are incorporated herein by reference in its entirety.

TECHNICAL FIELD

Embodiments described herein generally relate to cloud computing and in particular to collecting external data associated with external key performance indicators and breakdowns and rendering widgets using performance analytics representational state transfer application programming interfaces (REST APIs) to visualize data of both internal and external key performance indicators and breakdowns on a single performance analytics dashboard.

BACKGROUND

Cloud computing relates to sharing of computing resources that are generally accessed via the Internet. In particular, cloud computing infrastructure allows users to access a shared pool of computing resources, such as servers, storage devices, networks, applications, and/or other computing-based services. By doing so, users, such as individuals and/or enterprises, are able to access computing resources on demand that are located at remote locations in order to perform a variety of computing functions that include storing and/or processing computing data. For enterprise and other organization users, cloud computing provides flexibility in accessing cloud computing resources without accruing up-front costs, such as purchasing network equipment and investing time in establishing a private network infrastructure. Instead, by utilizing cloud computing resources, users are able redirect their resources to focus on core enterprise functions.

In today's communication networks, examples of cloud computing services a user may utilize include software as a service (SaaS) and platform as a service (PaaS) technologies. SaaS is a delivery model that provides software as a service rather than an end product. Instead of utilizing local network or individual software installations, software is typically licensed on a subscription basis, hosted on a remote machine, and accessed as needed. For example, users are generally able to access a variety of enterprise and/or information technology (IT) related software via a web browser. PaaS acts as an extension of SaaS that goes beyond providing software services by offering customizability and expandability features to meet a user's needs. For example, PaaS can provide a cloud-based developmental platform for users to develop, modify, and/or customize applications and/or automate enterprise operations without maintaining network infrastructure and/or allocating computing resources normally associated with these functions.

Within the context of cloud computing solutions, support personnel utilize the cloud-based developmental platform with customized enterprise applications to provide support services to an enterprise on a daily basis. Getting insight into how those services are performing is difficult and may involve processing large amounts of data, exporting the data to spreadsheets, and extracting insights. To obtain these insights regularly, an enterprise may rely on monthly reports to measure performance long after anything can be done to correct an issue causing performance roadblocks. Performance analytics in the context of cloud computing solutions providing support services involves automating the process of extracting insights and generating reports to enable stakeholders to improve service management on a daily basis instead of waiting for monthly reports.

SUMMARY

The following presents a simplified summary of the disclosed subject matter in order to provide a basic understanding of some aspects of the subject matter disclosed herein. This summary is not an exhaustive overview of the technology disclosed herein. It is not intended to identify key or critical elements of the invention or to delineate the scope of the invention. Its sole purpose is to present some concepts in a simplified form as a prelude to the more detailed description that is discussed later.

In one embodiment, a method includes: providing a hosted client instance over a network interface for communicatively coupling with a remote client device, the hosted client instance including a performance analytics module that is configured to present an internal key performance indicator and an external key performance indicator on a performance analytics dashboard; executing a query to a connection to an external data source over a network to obtain a result set of data associated with the external key performance indicator, the external data source being external to the hosted client instance; obtaining the result set of data from the external data source over a communication interface coupled to the network; and executing a plurality of representational state transfer application programming interfaces (REST APIs) associated with the performance analytics module to: store the result set of data in a performance analytics storage device on the hosted client instance, the performance analytics storage device storing both the data associated with the external key performance indicator and data associated with the internal key performance indicator; and render, via a user interface (UI) rendering engine of the performance analytics module, one or more widgets on the performance analytics dashboard, the REST APIs interacting with the data associated with the internal and external key performance indicators in the performance analytics storage device to render the one or more widgets.

In another embodiment, the method may be embodied in computer executable program code and stored in a non-transitory storage device. In yet another embodiment, the method may be implemented on a cloud-based computer system.

BRIEF DESCRIPTION OF DRAWINGS

For a more complete understanding of this disclosure, reference is now made to the following brief description, taken in connection with the accompanying drawings and detailed description, wherein like reference numerals represent like parts.

DESCRIPTION OF EMBODIMENTS

Figure 1:
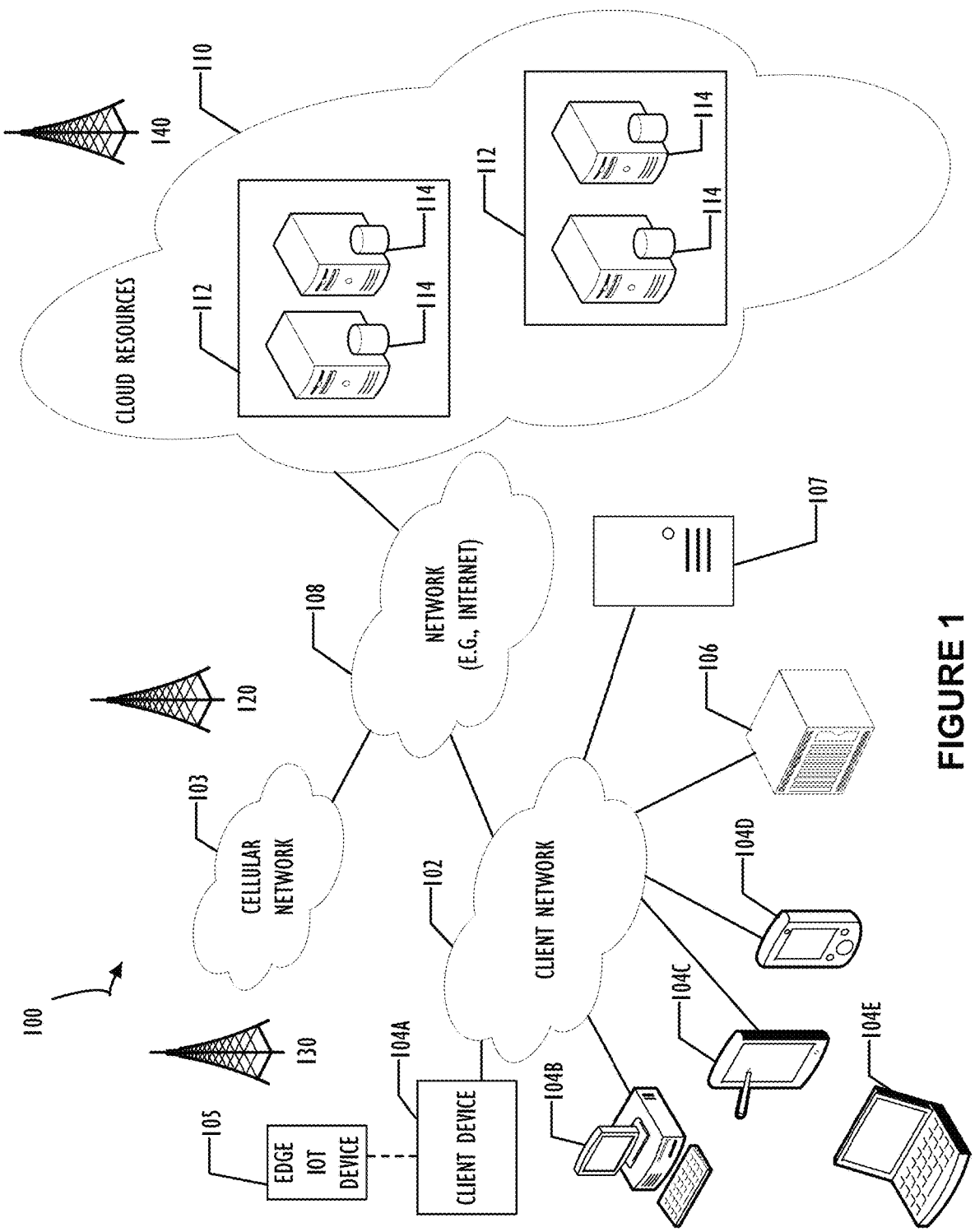
FIG. 1 illustrates a block diagram of a cloud computing infrastructure 100 where one or more embodiments of the present disclosure may operate.

In the following description, for purposes of explanation, numerous specific details are set forth in order to provide a thorough understanding of the embodiments disclosed herein. It will be apparent, however, to one skilled in the art that the disclosed embodiments may be practiced without these specific details. In other instances, structure and devices are shown in block diagram form in order to avoid obscuring the disclosed embodiments. Moreover, the language used in this disclosure has been principally selected for readability and instructional purposes, and may not have been selected to delineate or circumscribe the inventive subject matter, resorting to the claims being necessary to determine such inventive subject matter. Reference in the specification to "one embodiment" or to "an embodiment" means that a particular feature, structure, or characteristic described in connection with the embodiments is included in at least one embodiment.

The terms "a," "an," and "the" are not intended to refer to a singular entity unless explicitly so defined, but include the general class of which a specific example may be used for illustration. The use of the terms "a" or "an" may therefore mean any number that is at least one, including "one," "one or more," "at least one," and "one or more than one." The term "or" means any of the alternatives and any combination of the alternatives, including all of the alternatives, unless the alternatives are explicitly indicated as mutually exclusive. The phrase "at least one of" when combined with a list of items, means a single item from the list or any combination of items in the list. The phrase does not require all of the listed items unless explicitly so defined.

The term "computing system" is generally taken to refer to at least one electronic computing device that includes, but is not limited to, a single computer, virtual machine, virtual container, host, server, laptop, and/or mobile device or to a plurality of electronic computing devices working together to perform the function described as being performed on or by the computing system.

As used herein, the term "medium" refers to one or more non-transitory physical media that together store the contents described as being stored thereon. Embodiments may include non-volatile secondary storage, read-only memory (ROM), and/or random-access memory (RAM).

As used herein, the term "application" refers to one or more computing modules, programs, processes, workloads, threads and/or a set of computing instructions executed by a computing system. Example embodiments of an application include software modules, software objects, software instances and/or other types of executable code.

This disclosure pertains to collecting proprietary external data of an enterprise for performance analytics (PA) and rendering widgets using REST APIs to visualize key performance indicators (KPIs) and breakdowns associated with both the collected external data and internal PA data on a single dashboard. The internal PA data may be data associated with internal KPIs and breakdowns available on a customized PA application of a cloud-based developmental platform with multiple customized enterprise applications. Techniques described herein look to add, on a hosted client instance of the cloud-based developmental platform, an external data source where proprietary data of an enterprise may be stored and extract, from the external data source, the data for performance analytics by setting external KPIs and breakdowns corresponding to the external data. A data collection job may be scheduled to periodically obtain the data associated with the external KPIs and breakdowns from the external data source. Driver software may be implemented on the client instance to form a connection with the external data source to obtain the proprietary data. For example, the driver software may be implemented as a Java database connectivity application programming interface (JDBC API) to establish a JDBC connection with the external data source over a network. PA application logic on the client instance may then trigger queries to the external data source to obtain the data associated with the external KPIs and breakdowns. In one embodiment, aggregated scores with count for the external KPIs and breakdowns may be collected from the external data source instead of importing plain records matching the queries. REST APIs for performance analytics may be implemented to store the obtained external data on a storage device of the client instance where the internal data associated with the internal KPIs and breakdowns is also stored. The REST APIs may interact with data of both the internal and external KPIs and breakdowns stored the storage device of the client instance to render widgets, scorecards or other visualizations on a PA dashboard on a remote client device. The widgets may visualize data of both the internal and external KPIs and breakdowns on a single PA dashboard and set targets, thresholds, trendlines, and useful comments with respect to all data to enable centralized tracking and improving of processes of the enterprise based on the visualized external and internal KPIs and breakdowns.

Performance analytics may uncover daily trends with real-time actionable insights so that enterprise support personnel utilizing the client instance to provide support services can visualize areas for performance improvement and take immediate action before poor performance impacts the enterprise. Daily data may help optimize service performance more than conventional monthly report data because support personnel can see developing trends on a daily basis giving a forward view of blockages that lie ahead in the coming days and weeks. This may enable support personnel to address problems before they become performance roadblocks. Having a forward view of roadblocks that lie ahead in coming days and weeks can also enable support personnel in making informed decisions and take action toward issues that really need addressing. Thus, performance analytics may allow an enterprise to respond faster to requests and prevent growing service backlogs across all departments of the enterprise by providing an accurate perspective on all areas of service delivery. Further, because daily data of both external and internal KPIs and breakdowns may be visualized on the same PA dashboard, support personnel can obtain full benefits from the performance analytics functionality of the client instance for all data (both internal and external) of the enterprise. For example, dashboards, scorecards, widgets and other visualizations may be rendered and targets, thresholds, trendlines, and useful comments may be set and stored with respect to all data (both internal and external) of the enterprise.

FIG. 1 illustrates a block diagram of an embodiment of a cloud computing infrastructure 100 where one or more embodiments of the present disclosure mays operate. Cloud computing infrastructure 100 comprises a client network 102, network 108, and a cloud resources platform/network 110. In one embodiment, the client network 102 may be a local private network, such as local area network (LAN) that includes a variety of network devices that include, but are not limited to switches, servers, and routers. Each of these networks can contain wired or wireless programmable devices and operate using any number of network protocols (e.g., TCP/IP) and connection technologies (e.g., Wi-Fi® networks, Bluetooth®). Wi-Fi is a registered trademark of the Wi-Fi Alliance. Bluetooth is a registered trademark of Bluetooth Special Interest Group. In another embodiment, client network 102 represents an enterprise network that could include or be communicatively coupled to one or more local area networks (LANs), virtual networks, data centers and/or other remote networks (e.g., 108, 110). As shown in FIG. 1, client network 102 may be connected to one or more client devices 104A-E and allow the client devices to communicate with each other and/or with cloud resources platform/network 110. Client devices 104A-E may be computing systems such as desktop computer 104B, tablet computer 104C, mobile phone 104D, laptop computer (shown as wireless) 104E, and/or other types of computing systems generically shown as client device 104A. Cloud computing infrastructure 100 may also include other types of devices generally referred to as Internet of Things (IoT) (e.g., edge IOT device 105) that may be configured to send and receive information via a network to access cloud computing services or interact with a remote web browser application (e.g., to receive configuration information). FIG. 1 also illustrates that client network 102 may be connected to a local compute resource 106 that may include a server, access point, router, or other device configured to provide for local computational resources and/or to facilitate communication amongst networks and devices. For example, local compute resource 106 may be one or more physical local hardware devices configured to communicate with wireless network devices and/or facilitate communication of data between client network 102 and other networks such as network 108 and cloud resources platform/network 110. Local compute resource 106 may also facilitate communication between other external applications, data sources, and services, and client network 102. FIG. 1 also illustrates that client network 102 may be connected to a computer configured to execute a management, instrumentation, and discovery (MID) server 107. For example, MID server 107 may be a Java® application that runs as a Windows® service or UNIX® daemon. Java is a registered trademark of Oracle America, Inc. Windows is a registered trademark of Microsoft Corporation. UNIX is a registered trademark of The Open Group. MID server 107 may be configured to assist functions such as, but not necessarily limited to, discovery, orchestration, service mapping, service analytics, and event management. MID server 107 may be configured to perform tasks for a cloud-based instance while never initiating communication directly to the cloud-instance by utilizing a work queue architecture. This configuration may assist in addressing security concerns by eliminating that path of direct communication initiation.

Cloud computing infrastructure 100 also includes cellular network 103 for use with mobile communication devices. Mobile cellular networks support mobile phones and many other types of mobile devices such as laptops etc. Mobile devices in cloud computing infrastructure 100 are illustrated as mobile phone 104D, laptop 104E, and tablet 104C. A mobile device such as mobile phone 104D may interact with one or more mobile provider networks as the mobile device moves, typically interacting with a plurality of mobile network towers 120, 130, and 140 for connecting to the cellular network 103. Although referred to as a cellular network in FIG. 1, a mobile device may interact with towers of more than one provider network, as well as with multiple non-cellular devices such as wireless access points and routers (e.g., local compute resource 106). In addition, the mobile devices may interact with other mobile devices or with non-mobile devices such as desktop computer 104B and various types of client device 104A for desired services. Although not specifically illustrated in FIG. 1, client network 102 may also include a dedicated network device (e.g., gateway or router) or a combination of network devices that implement a customer firewall or intrusion protection system.

FIG. 1 illustrates that client network 102 is coupled to a network 108. Network 108 may include one or more computing networks, such as other LANs, wide area networks (WANs), the Internet, and/or other remote networks, in order to transfer data between client devices 104A-E and cloud resources platform/network 110. Each of the computing networks within network 108 may contain wired and/or wireless programmable devices that operate in the electrical and/or optical domain. For example, network 108 may include wireless networks, such as cellular networks in addition to cellular network 103. Wireless networks may utilize a variety of protocols and communication techniques (e.g., Global System for Mobile Communications (GSM) based cellular network) wireless fidelity Wi-Fi networks, Bluetooth, Near Field Communication (NFC), and/or other suitable radio-based networks as would be appreciated by one of ordinary skill in the art upon viewing this disclosure. Network 108 may also employ any number of network communication protocols, such as Transmission Control Protocol (TCP) and Internet Protocol (IP). Although not explicitly shown in FIG. 1, network 108 may include a variety of network devices, such as servers, routers, network switches, and/or other network hardware devices configured to transport data over networks.

In FIG. 1, cloud resources platform/network 110 is illustrated as a remote network (e.g., a cloud network) that is able to communicate with client devices 104A-E via client network 102 and network 108. The cloud resources platform/network 110 acts as a platform that provides additional computing resources to the client devices 104A-E and/or client network 102. For example, by utilizing the cloud resources platform/network 110, users of client devices 104A-E may be able to build and execute applications, such as automated processes for various enterprise, IT, and/or other organization-related functions. In one embodiment, the cloud resources platform/network 110 includes one or more data centers 112, where each data center 112 could correspond to a different geographic location. Within a particular data center 112 a cloud service provider may include a plurality of server instances 114. Each server instance 114 may be implemented on a physical computing system, such as a single electronic computing device (e.g., a single physical hardware server) or could be in the form of a multi-computing device (e.g., multiple physical hardware servers). Examples of server instances 114 include, but are not limited to, a web server instance (e.g., a unitary Apache® installation), an application server instance (e.g., unitary Java Virtual Machine), and/or a database server instance (e.g., a unitary MySQL® catalog). Apache is a registered trademark of Apache Software Foundation. MySQL is a registered trademark of My SQL AB.

To utilize computing resources within cloud resources platform/network 110, network operators may choose to configure data centers 112 using a variety of computing infrastructures. In one embodiment, one or more of data centers 112 are configured using a multi-tenant cloud architecture such that a single server instance 114, which can also be referred to as an application instance, handles requests and serves more than one customer. In some cases, data centers with multi-tenant cloud architecture commingle and store data from multiple customers, where multiple client instances are assigned to a single server instance 114. In a multi-tenant cloud architecture, the single server instance 114 distinguishes between and segregates data and other information of the various customers. For example, a multi-tenant cloud architecture could assign a particular identifier for each customer in order to identify and segregate the data from each customer. In a multitenancy environment, multiple customers share the same application, running on the same operating system, on the same hardware, with the same data-storage mechanism. The distinction between the customers is achieved during application design, thus customers do not share or see each other's data. This is different than virtualization where components are transformed, enabling each customer application to appear to run on a separate virtual machine. Generally, implementing a multi-tenant cloud architecture may have a production limitation, such as the failure of a single server instance 114 causing outages for all customers allocated to the single server instance 114.

In another embodiment, one or more of the data centers 112 are configured using a multi-instance cloud architecture to provide every customer its own unique client instance. For example, a multi-instance cloud architecture could provide each client instance with its own dedicated application server and dedicated database server. In other examples, the multi-instance cloud architecture could deploy a single server instance 114 and/or other combinations of server instances 114, such as one or more dedicated web server instances, one or more dedicated application server instances, and one or more database server instances, for each client instance. In a multi-instance cloud architecture, multiple client instances could be installed on a single physical hardware server where each client instance is allocated certain portions of the physical server resources, such as computing memory, storage, and processing power. By doing so, each client instance has its own unique software stack that provides the benefit of data isolation, relatively less downtime for customers to access the cloud resources platform/network 110, and customer-driven upgrade schedules. An example of implementing a client instance within a multi-instance cloud architecture will be discussed in more detail below when describing FIG. 2.

Figure 2:
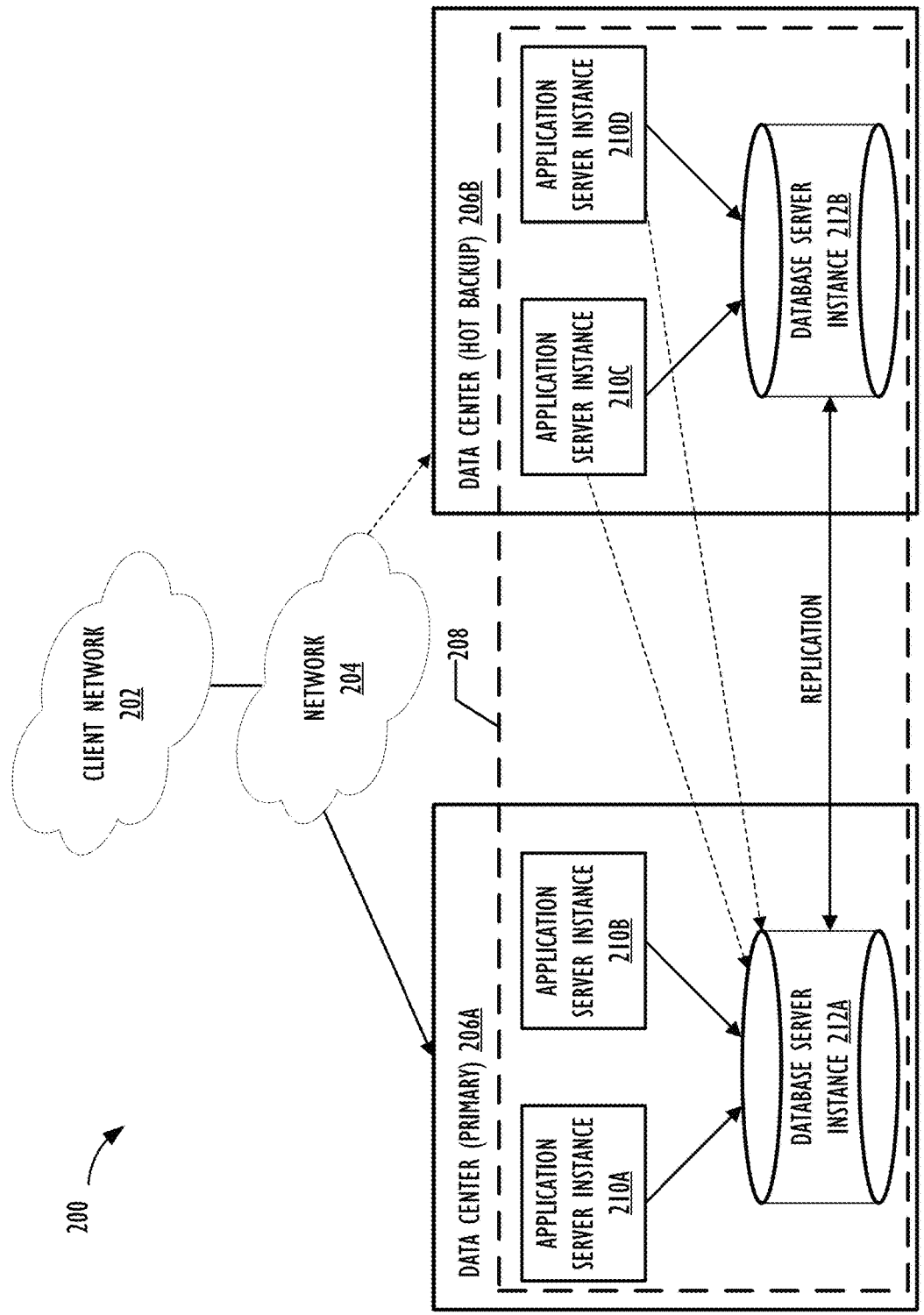
FIG. 2 illustrates a block diagram of a multi-instance cloud architecture 200 where one or more embodiments of the present disclosure may operate.

In one embodiment, utilizing a multi-instance cloud architecture, a first client instance may be configured with a client side application interface such as, for example, a web browser executing on a client device (e.g., one of client devices 104A-E of FIG. 1). FIG. 2 illustrates a block diagram of an embodiment of a multi-instance cloud architecture 200 where embodiments of the present disclosure may operate FIG. 2 illustrates that the multi-instance cloud architecture 200 includes a client network 202 that connects to two data centers 206A and 206B via network 204. Client network 202 and network 204 may be substantially similar to client network 102 and network 108 as described in FIG. 1, respectively. Data centers 206A and 206B can correspond to FIG. 1's data centers 112 located within cloud resources platform/network 110. Using FIG. 2 as an example, a client instance 208 is composed of four dedicated application server instances 210A-210D and two dedicated database server instances 212A and 212B, Stated another way, the application server instances 210A-210l1 and database server instances 212A and 212B are not shared with other client instances 208. Other embodiments of multi-instance cloud architecture 200 could include other types of dedicated server instances, such as a web server instance. For example, client instance 208 could include the four dedicated application server instances 210A-210D; two dedicated database server instances 212A and 212B, and four dedicated web server instances (not shown in FIG. 2).

To facilitate higher availability of client instance 208 application server instances 210A-210D and database server instances 212A and 212B are shown to be allocated to two different data centers 206A and 206B, where one of data centers 206 may act as a backup data center. In reference to FIG. 2 data center 206A acts as a primary data center that includes a primary pair of application server instances 210A and 210B and primary database server instance 212A for client instance 208, and data center 206B acts as a secondary data center to back up primary data center 206A for client instance 208. To back up primary data center 206A for client instance 208, secondary data center 206B includes a secondary pair of application server instances 210C and 210D and a secondary database server instance 212B. Primary database server instance 212A is able to replicate data to secondary database server instance 212B. As shown in FIG. 2, primary database server instance 212A replicates data to secondary database server instance 212B using a replication operation such as, for example, a Master-Master MySQL Binlog replication operation. The replication of data between data centers could be implemented in real time or by implementing full backup weekly and daily incremental backups in both data centers 206A and 206B. Having both a primary data center 206A and secondary data center 206B allows data traffic that typically travels to the primary data center 206A for client instance 208 to be diverted to secondary data center 206B during a failure and/or maintenance scenario. Using FIG. 2 as an example, if application server instances 210A and 210B and/or primary data server instance 212A fail and/or are under maintenance, data traffic for client instance 208 can be diverted to secondary application server instances 210C and 210D and secondary database server instance 212B for processing.

Although FIGS. 1 and 2 illustrate specific embodiments of cloud computing system 100 and multi-instance cloud architecture 200, respectively, the disclosure is not limited to the specific embodiments illustrated in FIGS. 1 and 2. For instance, although FIG. 1 illustrates that cloud resources platform/network 110 is implemented using data centers, other embodiments of the cloud resources platform/network 110 are not limited to data centers and can utilize other types of remote network infrastructures. Moreover, other embodiments of the present disclosure may combine one or more different server instances into a single server instance. Using FIG. 2 as an example, application server instances 210 and database server instances 212 can be combined into a single server instance. The use and discussion of FIGS. 1 and 2 are only exemplary to facilitate ease of description and explanation.

Figure 3:
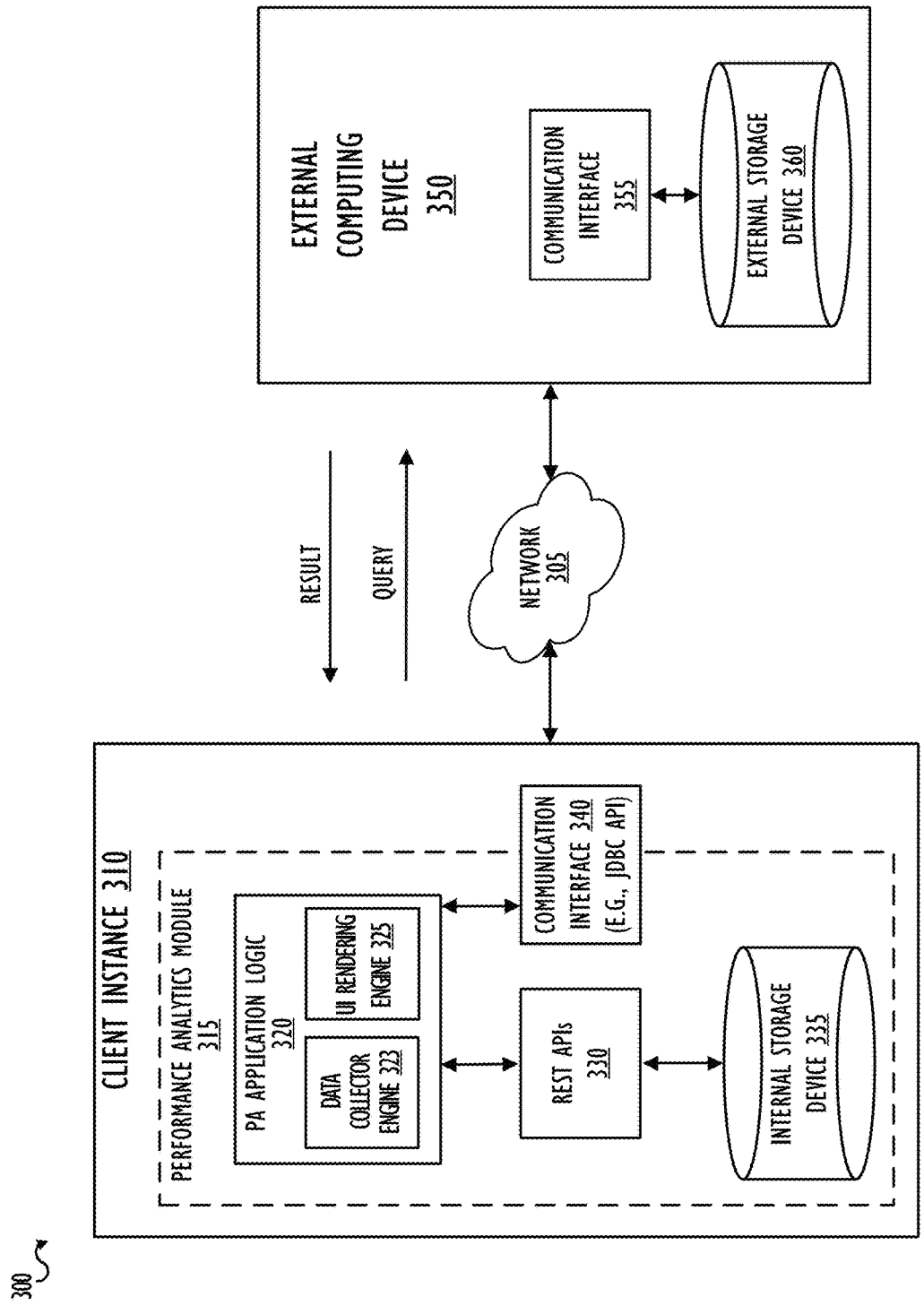
FIG. 3 illustrates a block diagram of a performance analytics system architecture 300 where one or more embodiments of the present disclosure may operate.

FIG. 3 illustrates a block diagram of PA system architecture 300 where one or more embodiments of the present disclosure may operate. PA system architecture 300 includes client instance 310 and external computing device 350 coupled with client instance 310 over network 305. Client instance 310 may be similar to client instance 208 of multi-instance cloud architecture 200 shown in FIG. 2. External computing device 350 may be any computing device which is external to client instance 310 and may include communication interface 355 and external storage device 360. In one embodiment, external computing device 350 may be a device on client network 102 of FIG. 1. In another embodiment, external computing device 350 may be a device on cloud resources platform/network 110 but external to client instance 310 hosted on cloud resources platform/network 110. In yet another embodiment, external computing device 350 may be any remote device that is communicatively coupled to client instance 310 via network 305. Network 305 may include one or more computing networks, such as LANs, WANs, the Internet, and/or other remote networks, in order to transfer data between client instance 310 and external computing device 350. Communication interface 355 is coupled with external storage device 360 to enable client instance 310 to interact with proprietary data on external storage device 360. For example, communication interface 355 may include an application programming interface (API) and driver software configured to enable interaction with data stored in external storage device 360. External storage device 360 may include a relational database storing proprietary information of an enterprise implementing hosted client instance 310 with customized applications for the enterprise. For example, the enterprise may be an information technology (IT) service provider enterprise and the proprietary information may be data associated with tools that are in addition to and separate from the tools and data of the enterprise that are available on and implemented using hosted client instance 310. As another example, the proprietary information may be sensitive human resources (HR) data from a legacy HR application of the enterprise that is not part of or implemented using client instance 310. Performance analytics may be enabled for this proprietary data that is outside client instance 310 by collecting this data and making it available to performance analytics module 315 on client instance 310.

In one embodiment, client instance 310 may be similar to client instance 208 of multi-instance cloud architecture 200 shown in FIG. 2. For ease of description, only relevant portions of client instance 310 are shown in FIG. 3 and described in detail. Client instance 310 includes performance analytics module 315 which implements a PA application on client instance 310. The PA application may complement conventional reporting of PA data and may be implemented using PA application logic 320, REST APIs 330, internal storage device 335 at a back end, and communication interface 340. PA application logic 320 may include data collector engine 323 and UI rendering engine 325. Data Collector engine 323 may collect aggregate scores associated with proprietary data in external computing device 350 occasionally or periodically on an ongoing basis by running data collection jobs. Data collector engine 323 may be coupled with computing device 350 via communication interface 340 that may in turn be connected to network 305. In one embodiment, communication interface 340 may be implemented as a JDBC API that defines how client instance 310 may access data on external computing device 350. Operations of data collector engine 323 of FIG. 3 for external data collection are described in detail below with reference to FIG. 4A.

Figure 4A:
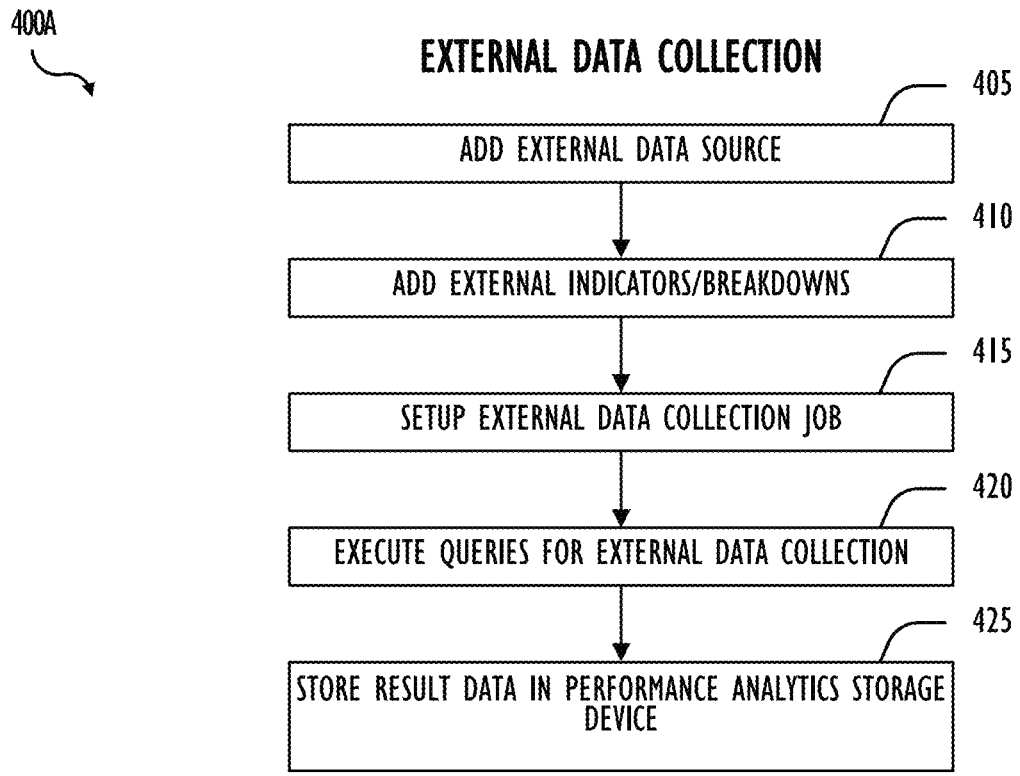
FIG. 4A shows flowchart 400A illustrating operations of data collector engine 323 of FIG. 3 for external data collection in accordance with one or more disclosed embodiments.

FIG. 4A shows flowchart 400A illustrating operations of data collector engine 323 of FIG. 3 for external data collection in accordance with one or more disclosed embodiments. Flowchart 400A begins at block 405 with data collector engine 323 adding an external data source. In one embodiment, data collector engine 323 may add the external data source upon obtaining connection information from a user of client instance 310. For example, connection information may include data source name, import set table name, type of connection (e.g., JDBC), connection format (e.g., Oracle®), connection format ID, connection format port, authentication information (e.g., user ID and password) server information, query language (e.g., SQL), query statement, and the like. Oracle is a registered trademark of Oracle Corporation.

At block 410 data collector engine 323 may add external indicators and breakdowns for which data collection from the external data source added at block 405 may be performed. Indicators (also known as KPIs, metrics or enterprise metrics) are a type of performance measurement used by enterprises to measure current conditions and forecast future trends. Indicators are commonly used to evaluate success or the success of a particular activity. Success may be defined as making progress toward strategic goals, or as the repeated achievement of some level of operational goal (e.g., zero defects, or 10/10 customer satisfaction). Indicators are usually associated with performance improvement initiatives. Scores associated with indicators are usually presented in graphs to make them easier to read and understand. Breakdowns (also known as dimensions or drilldowns) divide data of indicators in different ways. For example, incident data of a number of open incidents indicator can be divided by breakdowns including priority, category, assignment group, state or age. Indicators and breakdowns may be internal or external. That is, client instance 310 may provide "out of the box" internal indicators and breakdowns that may be further customized based on requirements of the enterprise. PA application logic 320 may also enable the user of client instance 310 to add additional internal indicators and breakdowns. Further, data collector engine 323 may enable the user of client instance 310 to add external indicators and breakdowns based on proprietary data stored in external storage device 360.

Figure 5:
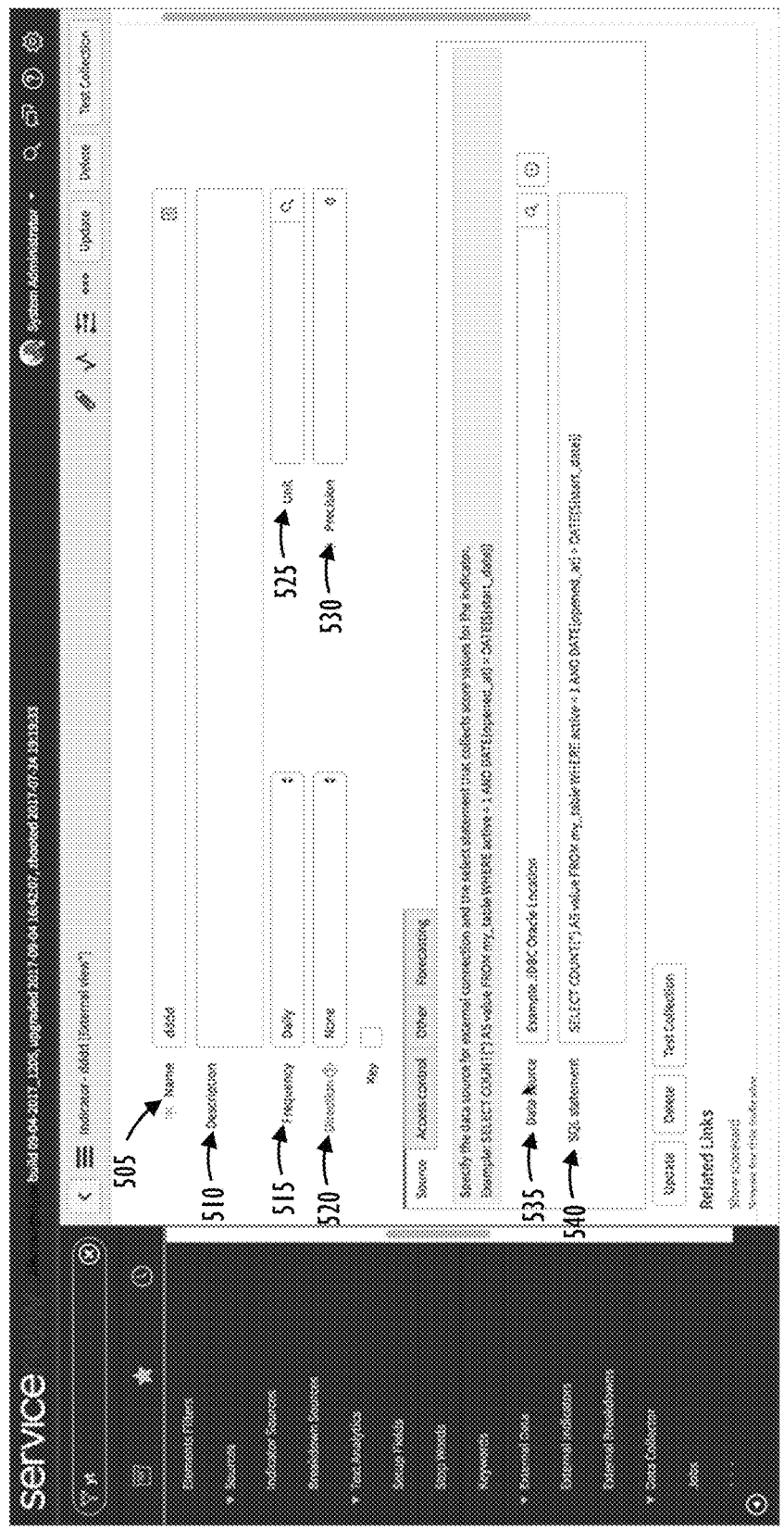
FIG. 5 shows a screen shot of graphical user interface (GUI) 500 for adding an external key performance indicator in accordance with one or more embodiments.

FIG. 5 shows a screen shot of a graphical user interface (GUI) 500 for adding an external indicator in accordance with one or more embodiments. GUI 500 may be displayed on a display to add an external indicator associated with data stored in external storage device 360. GUI 500 may include one or more user interactive screens that allow for a user to interact with a program of data collector engine 323 performing one or more of the operations described in FIG. 4A. GUI 500 may indicate to a user that data collector engine 323 is available to receive input values 505-540 from a user (e.g., via an input interface) to control GUI 500. As illustrated, input value 505 corresponds to a name field to input a descriptive name of the external indicator as defined by the user, and input value 510 corresponds to a description field to input more detailed description of what the external indicator does and its purpose. Input values 515-530 respectively correspond to a frequency field for displaying the external indicator on scorecards and widgets, such as Daily, Weekly, Bi-weekly, 4-Weeks, Monthly; a direction field indicating when an improvement of the external indicator value is taking place (e.g., Minimize (the lower the value the better) or Maximize (the higher the value, the better)); a unit field indicating a unit of measurement for the external indicator; and a precision field indicating a number of digits behind the decimal separator. Input value 535 corresponds to a data source field to specify the data source for external connection from where the score for the external indicator is to be imported. For example, the data source added by data collector engine 323 at block 405 may be selected as the data source for input value 535. Input value 540 may correspond to a select statement that collects score values for the external indicator. For example, the statement may be an SQL query. While input values 505-540 are illustrated in FIG. 5, it is appreciated that a fewer number or greater number of input values may be presented in connection with GUI 500. Additionally and/or alternately, other conditions separate from or in addition to those described above may correspond to input values 505-540. While GUI 500 illustrates only adding an external indicator, one or more external breakdowns associated with the external indicator may also be added using GUI 500.

Returning to FIG. 4A, at block 415 data collector engine 323 sets up a data collection job to collect from the data source external data associated with external indicators/breakdowns added at block 410. The data collection job may be a historic data collection job to collect historical data associated with the external indicators or breakdowns. Alternately, the data collection job may be a periodic data collection job that is scheduled to automatically perform data collection from the external data source on a periodic basis (e.g., daily, weekly, monthly). Data collector engine 323 may setup various parameters in association with the data collection job. For example, the parameters may include name, description, indicators and breakdowns to be collected, relative start and end interval, run time, conditions, and the like.

At block 420 data collector engine 323 may trigger queries for external data collection based on the data collection job set at block 415. For example, 50-100 queries may be triggered for a data collection job for an average size use case like getting scores for indicators and breakdowns on a proprietary HR application. In one embodiment, at block 420 for every indicator in the job a query may be run for that indicator to obtain a score of the indicator, for every breakdown linked to the indicator a query may be run to get all element names of the breakdown and a query may be run for every indicator-breakdown element combination to obtain a score for every element fetched, and the process may be repeated for all external indicators and breakdowns. Communication interface 340 implemented, for example, as a JDBC API may use a connection factory for creating JDBC connections. A JDBC connection may support creating and executing statements. These may be update statements such as SQL's CREATE, INSERT, UPDATE and DELETE, or they may be query statements such as SELECT. Query statements may return a JDBC row result set. Individual columns in a row may be retrieved either by name or by column number. In one embodiment, the external data collection may entail collection of aggregation scores from external storage device 360 via the JDBC connection established by communication interface 340. Data collector engine 323 may collect the aggregation scores by execute queries (e.g., select count(*) from external_table where . . . ) to the JDBC connection. Since only aggregation scores are collected, data collector engine 323 does not import plain records of matching rows from external storage device 360. That is, detailed information about the underlying records that are part of the score may not be collected. As a result, bandwidth use may be limited to sending queries and returning scores and lists of breakdown elements. Further, the aggregation may be performed in external computing device 350, and the JDBC connection may be defined only once and then used to execute several queries defined for one or more data collection jobs. Since connection information is needed only for querying indicator scores, indicator breakdown scores and breakdown elements, data collector ending 323 may define a data source with a dummy query which can be reused for every sent query. For example, following queries may be triggered at block 420:

1 query for every indicator to get its score. For example:
select count(*) from <table/view> where <condition>;
or
select avg(field) from <table/view> where <condition>
1 query for every breakdown to get the elements of the breakdown (e.g., the priority values like High, Medium, Low). For example:
select id, name from <table/view> where <element condition>
1 query for every indicator-breakdown combination to get their scores. For example,
Select id AS elementId, count(*) from <table/view> where <condition> group by id At block 425 data collector engine 323 may store proprietary data obtained by querying external storage device 360 in internal storage device 335 along with internal data of performance analytics indicators and breakdowns. The data may be stored at block 425 by data collector engine 323 using REST APIs 330. REST APIs 330 are described in more detail later. Internal storage device 335 may be a relational database storing PA data associated with both internal and external indicators and breakdowns.

Figure 6:
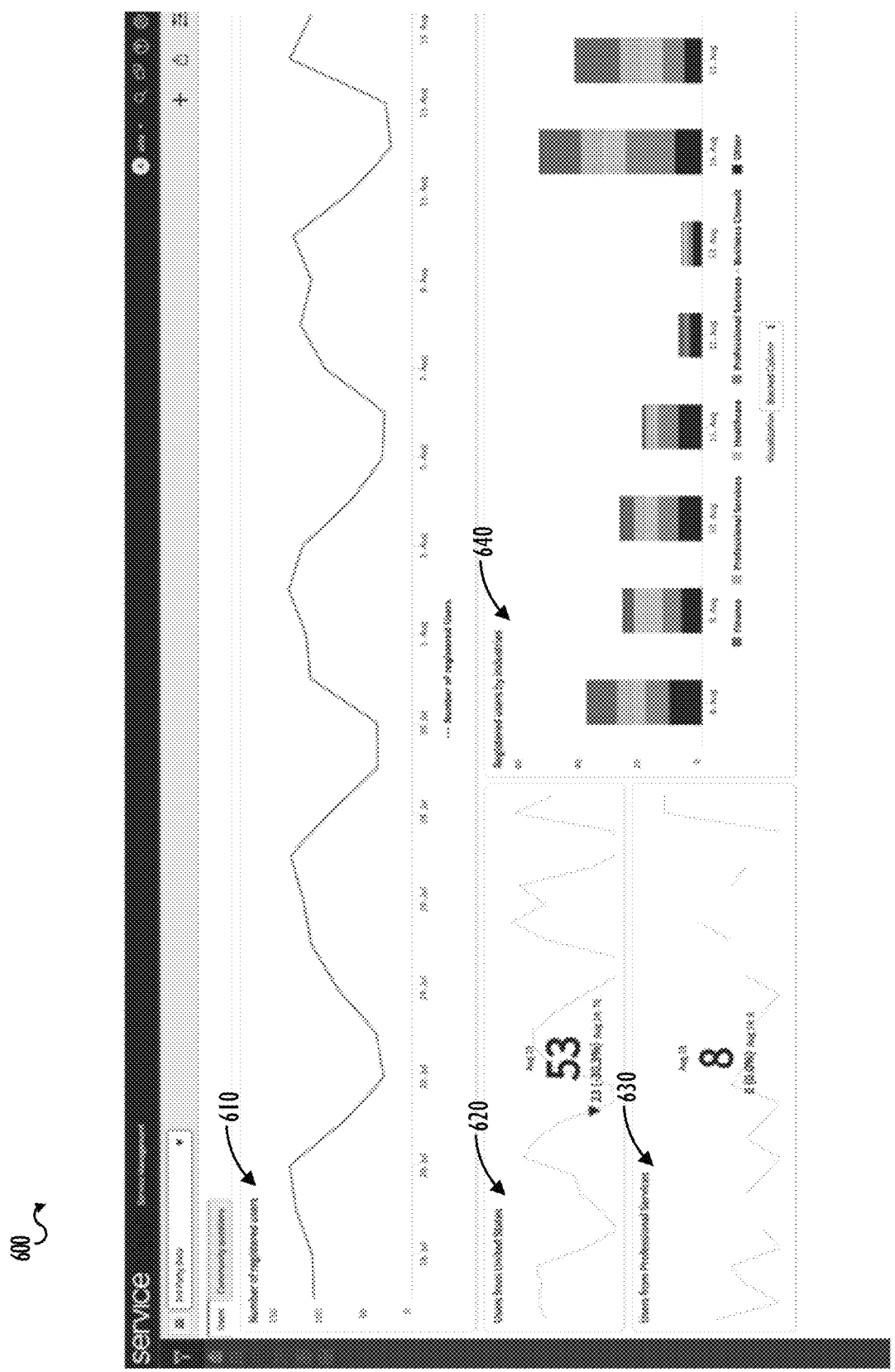
FIG. 6 shows a screen shot of GUI 600 for rendering widgets on a PA dashboard to visualize data associated with indicators and breakdowns in accordance with one or more embodiments.

Returning to FIG. 3, in order to get full benefits from PA functionality, UI rendering engine 325 may render dashboards, scorecards, widgets and other visualizations using both the obtained proprietary data from external storage device 360 and data associated with internal PA indicators and breakdowns stored in internal storage device 335. UI rendering engine 325 may include logic to visualize the PA application at the front end. For example, UI rendering engine 325 may include logic to visualize (internal and external) indicators, scorecards, dashboards, and/or widgets on a client device. Scorecards refer to a graphical visualization of the scores of an indicator. Scorecards can be enhanced by adding targets, thresholds, trendlines, and useful comments for significant changes. In a scorecard, the scores of an indicator may be analyzed further by viewing the scores by breakdowns (scores per group), aggregates (counts, sums, and maximums), time series (totals and averages applied to different time periods) and (if available) drilling down to the records on which the scores are based. Dashboards may refer to a visualization presented to a user of client instance 310 based on PA data (See FIG. 6 illustrating a PA dashboard. FIG. 6 is explained in detail later). A dashboard may have multiple tabs to analyze and interact with visualizations of indicator scores, called widgets. Each tab of the dashboard may hold one or more widgets. A user may have one or more dashboards assigned for viewing. Widgets determine how data is presented on dashboards and are visible only when added to a dashboard. Widgets allow visualizations of multiple indicators on a single PA dashboard in order to visualize multiple score sources. A widget can be configured to have different visualization types to display data as a time series, score, list, or breakdown. For example, a widget can be configured as a chart, latest score, speedometer, dial, scorecard, or column.

UI rendering engine 325 may be implemented using any suitable programming language. In one embodiment, UI rendering engine 325 may be implemented using JavaScript® and may use one or more JavaScript libraries including Lodash, Moment, React, Redux, Redux-Saga, Uuid and Word-Cloud.). JavaScript is a registered trademark of Oracle America, Inc. UI rendering engine 325 may be capable of handling external dependencies and be modular. Widgets implemented using UI rendering engine 325 may be implemented in React and may use Redux for storing data and Redux-Saga for handling application side effects. The widgets may be React components that are always exported connected to a Redux store. There may also be other common React components which are not connected to any Redux store, and which the widgets may use for exporting as components so that they can be used anywhere, without needing a Redux store behind them. Further, UI rendering engine 325 may enable dynamic creation of widgets so that if a widget is passed on all required parameters, the widget may be rendered on the spot, without first having to save data to a database. When rendering a widget to visualize PA data, UI rendering engine 325 may submit an API request to REST API 330. For example, the API request may be composed of the following files:
  an api file which calls the API and returns a promise with the result.
  a saga file which "listens" to the proper dispatched action, sends a request using the API file and sends another action to a store with the response of the API
  a constants file which stores constants (such as action names for stores)
  an action creators file which stores functions that return the action object with given parameters
  a reducers file which may handle the action sent from the saga and put the data in the store The API file, the saga file and the reducers file may also each have a spec file where unit tests for them are stored. Since a widget implemented using UI rendering engine 325 does not have to fetch a template, an extra request to fetch the template is eliminated. Further, since the widget uses standard libraries for common actions and does not have an iframe, code and other resources are fetched only once and do not have to be fetched for each instance of a widget on a page thereby minimizing the number of resource calls. Finally, a widget implemented using UI rendering engine 325 minimizes the number of Document Object Model (DOM) manipulations of the widget. Thus, a widget implemented using UI rendering engine 325 is simple and easy to understand and extend. UI rendering engine 325 may interact with internal storage device 335 to obtain PA data associated with internal and external indicators and breakdowns using PA REST APIs 330. For example, REST APIs 330 may interact with PA data stored in internal storage device 335 to make the data available to UI rendering engine 325 for visualization in a mobile application or other internal customized enterprise applications. REST APIs 330 may enable better separation between front end components (e.g., UI rendering engine 325) and backend functionality including internal storage device 335. REST APIs 330 may include plural end points with the ability to access all PA data (including data associated with internal and external indicators and breakdowns) as well as ability to modify the data.

Exposing all PA data on internal storage device 335 using the REST APIs 330 may enable support personnel of client instance 310 to create custom UI applications that utilize the data on internal storage device 335. Implementing REST APIs 330 may improve the performance over conventional implementations for data access by reducing overhead and simplifying codebase. REST APIs 330 may include APIs for different PA related web services including retrieving, adding, updating and deleting score notes, targets, thresholds, indicators, indicator sources, breakdowns, breakdown sources, widgets, chart data, and visualizations. Thus, UI rendering engine 325 can use one or more of these APIs to perform a variety of visualizations for PA data on a dashboard of client instance 310 on client device. For example, a sample request to retrieve a score note may be implemented by UI rendering engine 325 by making one of the following requests to a corresponding API out of REST APIs 330:
  GET/api/now/v1/pa/comments/GET
  /api/now/v1/pa/comments/{sys_id}
In response, UI rendering engine 325 may receive the following data as key-value pairs in, for example, JavaScript Object Notation (JSON) file format from the corresponding REST API 330:

```
Response JSON:
{
    "comments": [
        {
            "uuid": "uuid associated to the score note",
            "start_at": "20170606",
            "text": "the content of the new score note to create",
            "sys_id": "sys_id of the score note record",
            "user": "sys_id of a user record associated to the score note",
            "sys_domain": "the domain which this score note belongs to"
        },
        ...
    ]
}
```

As another example, a sample request to add a new indicator may be implemented by rendering engine 325 making the following requests to the corresponding API of REST APIs 330:
  POST/api/now/v1/pa/indicators
To add the new indicator, UI rendering engine 325 may send as a request the following data as key-value pairs in, for example, JavaScript Object Notation (JSON) file format to the corresponding REST API 330:

```
Request JSON:
{
    "unit": "#",
    "value_when_nil": 0,
    "name": "Number of new incidents",
    "description": "Number of incidents based on registration date.",
    "type": integer,
    "facts_table": "incident",
    "conditions": "string",
    "display": boolean,
    "formula": "string",
    "key": boolean,
    "scores_modified_at": "datetime",
    "frequency": integer,
    "direction": "MINIMIZE",
    "contributor": "sys_id of user record",
    "precision": integer,
    "default_chart_type": "string",
```

-continued

```
"default_aggregate": "sys_id of pa_aggregates record",
"indicator_source": "sys_id of pa_cubes record",
"aggregate": "string",
"field": "field name from the selected facts_table",
"scripted": boolean,
"script": "string",
"role_override": boolean,
"roles": "comma separated list of sys_id of user records",
"distinct": boolean,
"distinct_field": "field name from the selected facts table",
"collect_records": boolean,
"collect_breakdown_matrix": boolean,
"order": integer,
"render_continuous_lines": boolean,
"formula_aggregate_whole": boolean,
"show_realtime_score": boolean,
"show_delta": boolean,
"related_breakdowns": integer,
"related_jobs": integer,
"has_managed_indicators": boolean,
"managing_indicator": "sys_id of pa_indicators record",
"managed_breakdown": "sys_id of pa_breakdowns record",
"managed_element": "string",
"visible_to": integer,
"groups": "comma separated list of sys_user_group records",
"users": "comma separated list of sys_user records",
"override_periods": boolean,
"score_periods": integer,
"snapshot_periods": integer,
"forecast_method": integer,
"forecast_periods": integer,
"forecast_base_type": integer,
"forecast_base_periods": integer,
"forecast_base_start": integer
}
```

Figure 4B:
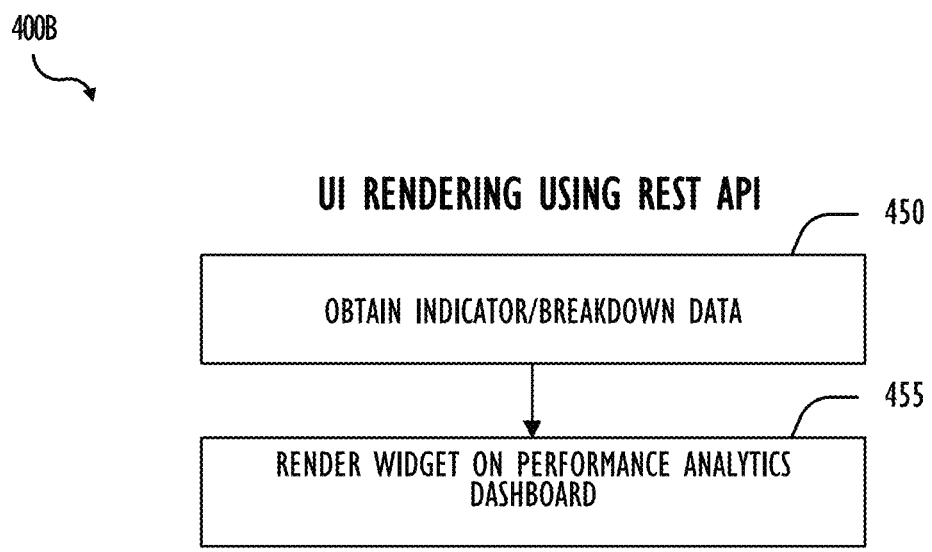
FIG. 4B shows flowchart 400B illustrating operations of user interface (UI) rendering engine 325 of FIG. 3 for UI rendering and data visualization using REST APIs in accordance with one or more disclosed embodiments.

FIG. 4B shows flowchart 400B illustrating operations of user interface (UI) rendering engine 325 of FIG. 3 for UI rendering and data visualization using REST APIs in accordance with one or more disclosed embodiments. Flowchart 400B begins at block 450 with rendering engine 325 obtaining PA data associated with internal and external indicators and breakdowns. The PA data may be obtained by UI rendering engine 325 via REST APIs 330 that interact with internal storage device 335 and make PA data stored in internal storage device 335 available to front end applications. At block 455 UI rendering engine 325 may render one or more widgets on a PA dashboard to visualize the PA data obtained at block 450. Depending on the functionality or data desired, UI rendering engine 325 may use corresponding one or more APIs of the REST APIs 330 to perform the operations of block 450-455. For example, UI rendering engine 325 may make requests to APIs to obtain respective scores of an external indicator and one or more breakdowns associated with the indicator, and UI rendering engine 325 may then use other APIs to render one or more widgets and pass as parameters to the widgets, the obtained PA data corresponding to the external indicators and breakdowns. Widgets rendered on a PA dashboard to visualize data associated with indicators and breakdowns in accordance with one or more embodiments are illustrated in a screen shot of GUI 600 in FIG. 6.

GUI 600 may be displayed on a display device to visualize PA data associated with indicators and breakdowns on a PA dashboard. GUI 600 may include one or more user interactive screens that allow for a user to interact with a program of UI rendering engine 325 performing one or more of the operations described in FIG. 4B. The PA dashboard of GUI 600 forms an entry point for users of performance analytics. A dashboard shows widgets for the most relevant indicators for specific users or groups. Information can be presented using several visualizations, such as charts, scorecards, lists, or dials. Dashboards may be divided into tabs to logically group widgets that belong together. Separate dashboards may be created according to topic, for example, incident management, problem management, or request management. A dashboard may have multiple rows with each row having a number of "placeholders" or columns, and each placeholder holding a widget and each widget containing information about one or more indicators and breakdowns. As shown in FIG. 6, PA dashboard of GUI 600 has widgets 610, 620, 630 and 640. Widget 610 visualizes daily aggregate scores of an external indicator (i.e., "Number of Registered Users") and widgets 620-640 present different visualizations of aggregate scores of the same external indicator for different breakdowns and elements (i.e., "Users from United States", "Users from Professional Services", and "Registered Users by Industries"). While GUI 600 of FIG. 6 illustrates a PA dashboard with widgets that visualize data that is only associated with external indicators and breakdowns, the PA dashboard may also render widgets that visualize data associated with both internal and external indicators and breakdowns on the same dashboard. Alternatively, or in addition, the PA dashboard may show scorecards, charts, columns or other visualizations for presenting the PA data associated with both internal and external indicators and breakdowns.

Figure 7:
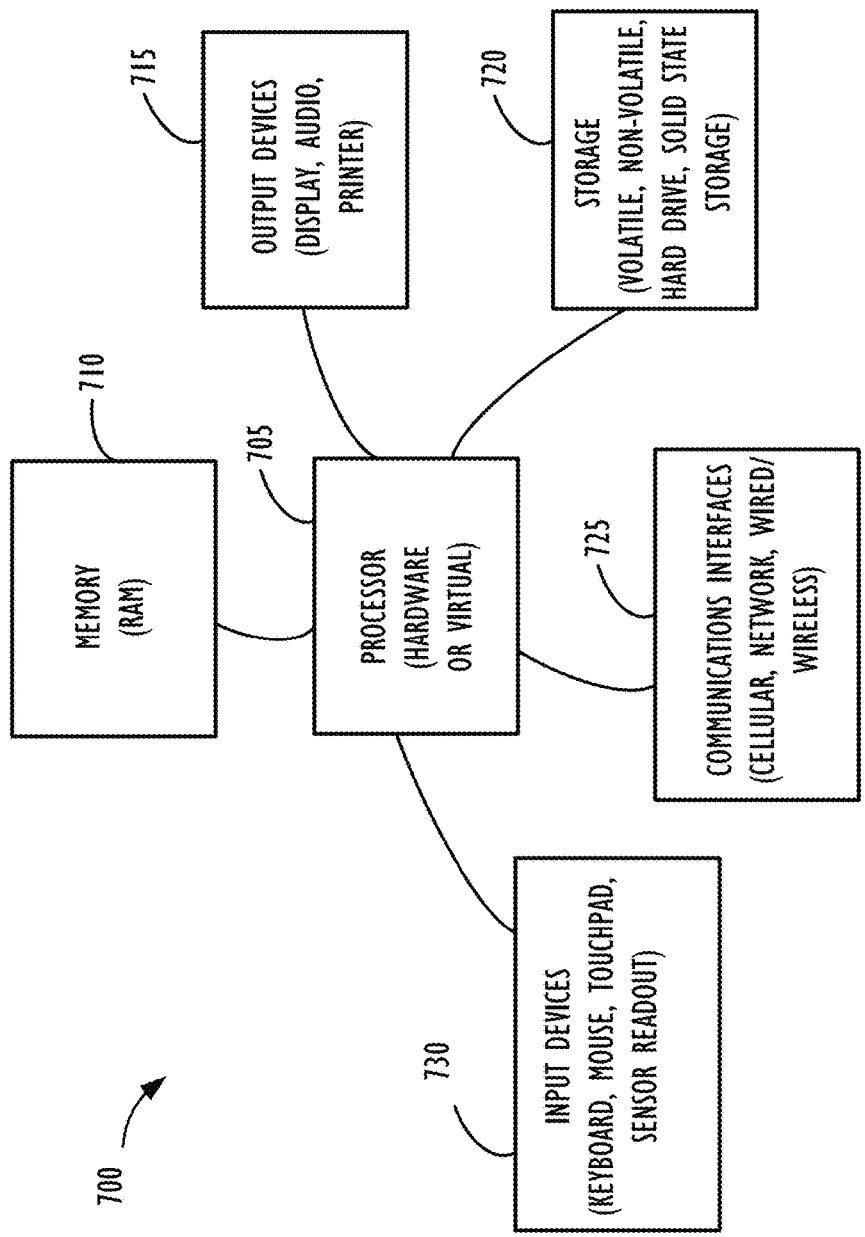
FIG. 7 illustrates a high-level block diagram 700 of a processing device (computing system) that may be used to implement one or more disclosed embodiments.

FIG. 7 illustrates a high-level block diagram 700 of a processing device (computing system) that may be used to implement one or more disclosed embodiments (e.g., service provider cloud infrastructure 110, client devices 104A-104E, server instances 114, data centers 206A-206B, etc.). For example, computing device 700 illustrated in FIG. 7 could represent a client device or a physical server device and include either hardware or virtual processor(s) depending on the level of abstraction of the computing device. In some instances (without abstraction) computing device 700 and its elements as shown in FIG. 7 each relate to physical hardware and in some instances one, more, or all of the elements could be implemented using emulators or virtual machines as levels of abstraction. In any case, no matter how many levels of abstraction away from the physical hardware, computing device 700 at its lowest level may be implemented on physical hardware. As also shown in FIG. 7, computing device 700 may include one or more input devices 730, such as a keyboard, mouse, touchpad, or sensor readout (e.g., biometric scanner) and one or more output devices 715, such as displays, speakers for audio, or printers. Some devices may be configured as input/output devices also (e.g., a network interface or touchscreen display). Computing device 700 may also include communications interfaces 725, such as a network communication unit that could include a wired communication component and/or a wireless communications component, which may be communicatively coupled to processor 705. The network communication unit may utilize any of a variety of proprietary or standardized network protocols, such as Ethernet, TCP/IP, to name a few of many protocols, to effect communications between devices. Network communication units may also comprise one or more transceivers that utilize the Ethernet, power line communication (PLC), Wi-Fi, cellular, and/or other communication methods.

As illustrated in FIG. 7, processing device 700 includes a processing element such as processor 705 that contains one or more hardware processors, where each hardware processor may have a single or multiple processor cores. In one embodiment, the processor 705 may include at least one shared cache that stores data (e.g., computing instructions)

that are utilized by one or more other components of processor 705. For example, the shared cache may be a locally cached data stored in a memory for faster access by components of the processing elements that make up processor 705. In one or more embodiments, the shared cache may include one or more mid-level caches, such as level 2 (L2), level 3 (L3), level 4 (L4), or other levels of cache, a last level cache (LLC), or combinations thereof. Examples of processors include, but are not limited to a central processing unit (CPU) a microprocessor. Although not illustrated in FIG. 7, the processing elements that make up processor 705 may also include one or more other types of hardware processing components, such as graphics processing units (GPUs), application specific integrated circuits (ASICs), field-programmable gate arrays (FPGAs), and/or digital signal processors (DSPs).

FIG. 7 illustrates that memory 710 may be operatively and communicatively coupled to processor 705. Memory 710 may be a non-transitory medium configured to store various types of data. For example, memory 710 may include one or more storage devices 720 that comprise a non-volatile storage device and/or volatile memory. Volatile memory, such as random access memory (RAM), can be any suitable non-permanent storage device. The non-volatile storage devices 720 can include one or more disk drives, optical drives, solid-state drives (SSDs), tap drives, flash memory, read only memory (ROM), and/or any other type memory designed to maintain data for a duration time after a power loss or shut down operation. In certain instances, the non-volatile storage devices 720 may be used to store overflow data if allocated RAM is not large enough to hold all working data. The non-volatile storage devices 720 may also be used to store programs that are loaded into the RAM when such programs are selected for execution.

Persons of ordinary skill in the art are aware that software programs may be developed, encoded, and compiled in a variety of computing languages for a variety of software platforms and/or operating systems and subsequently loaded and executed by processor 705. In one embodiment, the compiling process of the software program may transform program code written in a programming language to another computer language such that the processor 705 is able to execute the programming code. For example, the compiling process of the software program may generate an executable program that provides encoded instructions (e.g., machine code instructions) for processor 705 to accomplish specific, non-generic, particular computing functions.

After the compiling process, the encoded instructions may then be loaded as computer executable instructions or process steps to processor 705 from storage 720, from memory 710, and/or embedded within processor 705 (e.g., via a cache or on-board ROM). Processor 705 may be configured to execute the stored instructions or process steps in order to perform instructions or process steps to transform the computing device into a non-generic, particular, specially programmed machine or apparatus. Stored data, e.g., data stored by a storage device 720, may be accessed by processor 705 during the execution of computer executable instructions or process steps to instruct one or more components within the computing device 700.

A user interface (e.g., output devices 715 and input devices 730) can include a display, positional input device (such as a mouse, touchpad, touchscreen, or the like), keyboard, or other forms of user input and output devices. The user interface components may be communicatively coupled to processor 705. When the output device is or includes a display, the display can be implemented in various ways, including by a liquid crystal display (LCD) or a cathode-ray tube (CRT) or light emitting diode (LED) display, such as an OLED display. Persons of ordinary skill in the art are aware that the computing device 700 may comprise other components well known in the art, such as sensors, powers sources, and/or analog-to-digital converters, not explicitly shown in FIG. 7.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes 2, 3, 4, etc.; greater than 0.10 includes 0.11, 0.12, 0.13, etc.). The use of the term "about" means ±10% of the subsequent number, unless otherwise stated.

Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure.

It is to be understood that the above description is intended to be illustrative and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. It should be noted that the discussion of any reference is not an admission that it is prior art to the present invention, especially any reference that may have a publication date after the priority date of this application.

What is claimed is:

1. A cloud-based computer system, comprising:
   a network interface; and
   a memory partition communicatively coupled to one or more processing units and the network interface, wherein the memory partition comprises computer instructions that when executed by the one or more processing units cause the cloud-based computer system to:
   provide a hosted client instance over the network interface for communicatively coupling with a remote client device, the hosted client instance including a performance analytics module that is configured to present an internal key performance indicator and an external key performance indicator on a performance analytics dashboard;
   execute a query to a connection to an external data source over a network to obtain a result set of external data associated with the external key performance indicator, wherein the external data source is external to the hosted client instance;

obtain the result set of external data from the external data source over a communication interface coupled to the network; and execute a plurality of representational state transfer application programming interfaces (REST APIs) associated with the performance analytics module to:

store the result set of external data in an internal storage device of the hosted client instance, wherein the internal storage device stores both the external data associated with the external key performance indicator and internal data associated with the internal key performance indicator;

retrieve the external data associated with the external key performance indicator and the internal data associated with the internal key performance indicator from the internal storage device of the hosted client instance; and render, via a user interface (UI) rendering engine of the performance analytics module, one or more widgets on the performance analytics dashboard, wherein the REST APIs interact with the data associated with the internal and external key performance indicators in the internal storage device to render the one or more widgets.

2. The cloud-based computer system according to claim 1, wherein the one or more widgets are associated with the internal and external key performance indicators and visualize the data associated with the internal and external key performance indicators on the performance analytics dashboard.

3. The cloud-based computer system according to claim 2, wherein the remote client device is a portable electronic device, and the REST APIs render the one or more widgets to visualize the data associated with the internal and external key performance indicators on the portable electronic device.

4. The cloud-based computer system according to claim 1, wherein the connection is a Java database connectivity (JDBC) connection, and the communication interface is a JDBC application programming interface (API).

5. The cloud-based computer system according to claim 1, wherein the result set of external data includes aggregation data indicating an aggregated score corresponding to a number of records satisfying a condition specified by the executed query, wherein the aggregated score is determined at the external data source.

6. The cloud-based computer system according to claim 5, wherein the external key performance indicator includes a plurality of breakdowns, each breakdown including a plurality of elements, and wherein the memory partition further comprises computer instructions that when executed by the one or more processing units cause the cloud-based computer system to:

execute a plurality of queries to the connection to the external data source to obtain a plurality of respective aggregated scores for each of the elements of each of the plurality of breakdowns of the external key performance indicator.

7. The cloud-based computer system according to claim 1, wherein the REST APIs are configured to:

modularize interaction of the internal key performance indicators on the internal storage device at a back end with the UI rendering engine of the performance analytics module at a front end; and enable interaction of a custom built UI application of the hosted client instance at the front end with the internal storage device at the back end.

8. The cloud-based computer system according to claim 7, wherein the custom built UI application implements one or more JavaScript libraries for visualization.

9. The cloud-based computer system according to claim 1, wherein each of the one or more widgets is configured to load associated data only once when the widget is initially loaded onto the performance analytics dashboard.

10. The cloud-based computer system according to claim 9, wherein the query is one of:

a score collection query to collect an aggregated score corresponding to matching records from the external data source; and an element collection query to collect an identifier associated with a breakdown or element of the external key performance indicator.

11. The cloud-based computer system of claim 1, wherein the hosted client instance runs on a dedicated application server hosted on a cloud network.

12. The cloud-based computer system of claim 1, wherein the external data source is a client device communicatively coupled to the hosted client instance via a client network.

13. The cloud-based computer system of claim 1, wherein the external data source is a remote device disposed outside of a client network of the hosted client instance.

14. A method comprising:

providing a hosted client instance over a network interface for communicatively coupling with a remote client device, the hosted client instance including a performance analytics module that is configured to present an internal key performance indicator and an external key performance indicator on a performance analytics dashboard;

executing a query to a connection to an external data source over a network to obtain a result set of external data associated with the external key performance indicator, wherein the external data source is external to the hosted client instance;

obtaining the result set of external data from the external data source over a communication interface coupled to the network; and executing a plurality of representational state transfer application programming interfaces (REST APIs) associated with the performance analytics module to:

store the result set of external data in internal storage device of the hosted client instance, wherein the internal storage device stores both the external data associated with the external key performance indicator and internal data associated with the internal key performance indicator;

retrieve the external data associated with the external key performance indicator and the internal data associated with the internal key performance indicator from the internal storage device of the hosted client instance; and render, via a user interface (UI) rendering engine of the performance analytics module, one or more widgets on the performance analytics dashboard, wherein the REST APIs interact with the data associated with the internal and external key performance indicators in the internal storage device to render the one or more widgets.

15. The method according to claim 14, wherein the one or more widgets are associated with the internal and external key performance indicators and visualize the data associated with the internal and external key performance indicators on the performance analytics dashboard.

16. The method according to claim 15, wherein the remote client device is a portable electronic device, and the REST API renders the one or more widgets to visualize the data associated with the internal and external key performance indicators on the portable electronic device.

17. The method according to claim 14, wherein the result set of external data includes aggregation data indicating an aggregated score corresponding to a number of records satisfying a condition specified by the executed query, wherein the aggregated score is determined at the external data source.

18. The method according to claim 17, wherein the external key performance indicator includes a plurality of breakdowns, each breakdown including a plurality of elements, and wherein the method further comprises:

executing a plurality of queries to the connection to the external data source to obtain a plurality of respective aggregated scores for each of the elements of each of the plurality of breakdowns of the external key performance indicator.

19. The method according to claim 14, wherein the query is a structured query language (SQL) statement.

20. A non-transitory computer-readable recording medium having stored thereon a program for a computer of a cloud-based computer system, the program comprising instructions that when executed by one or more processing units of the computer cause the cloud-based computer system to:

provide a hosted client instance over a network interface for communicatively coupling with a remote client device, the hosted client instance including a performance analytics module that is configured to present an internal key performance indicator and an external key performance indicator on a performance analytics dashboard;

execute a query to a connection to an external data source over a network to obtain a result set of external data associated with the external key performance indicator, wherein the external data source is external to the hosted client instance;

obtain the result set of external data from the external data source over a communication interface coupled to the network; and execute a plurality of representational state transfer application programming interfaces (REST APIs) associated with the performance analytics module to:

store the result set of external data in a internal storage device of the hosted client instance, wherein the internal storage device stores both the external data associated with the external key performance indicator and internal data associated with the internal key performance indicator; and render, via a user interface (UI) rendering engine of the performance analytics module, one or more widgets on the performance analytics dashboard, wherein the REST APIs interact with the data associated with the internal and external key performance indicators in the internal storage device to render the one or more widgets.

\* \* \* \* \*